Aug. 21, 1934.                M. W. WATKINS                1,970,991
                               MEAT TENDERER
                           Filed Dec. 30, 1932          2 Sheets-Sheet 1
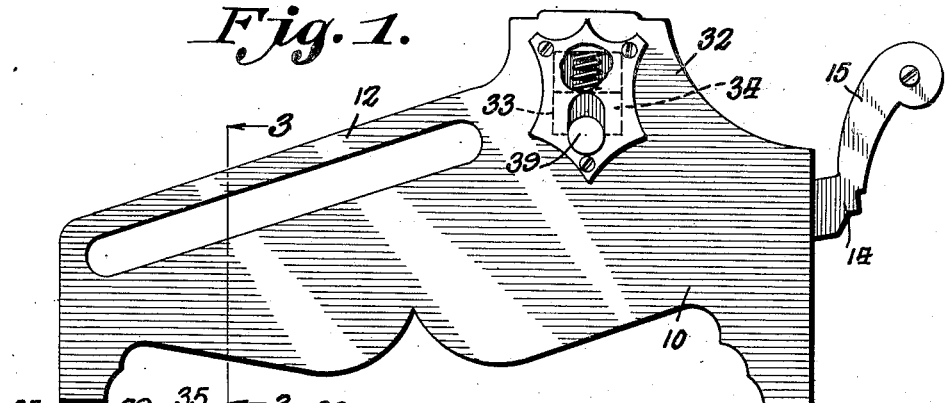
Fig. 1.
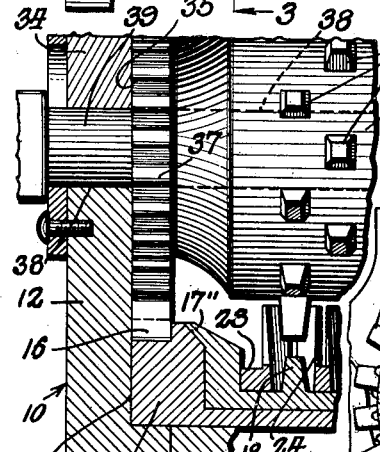
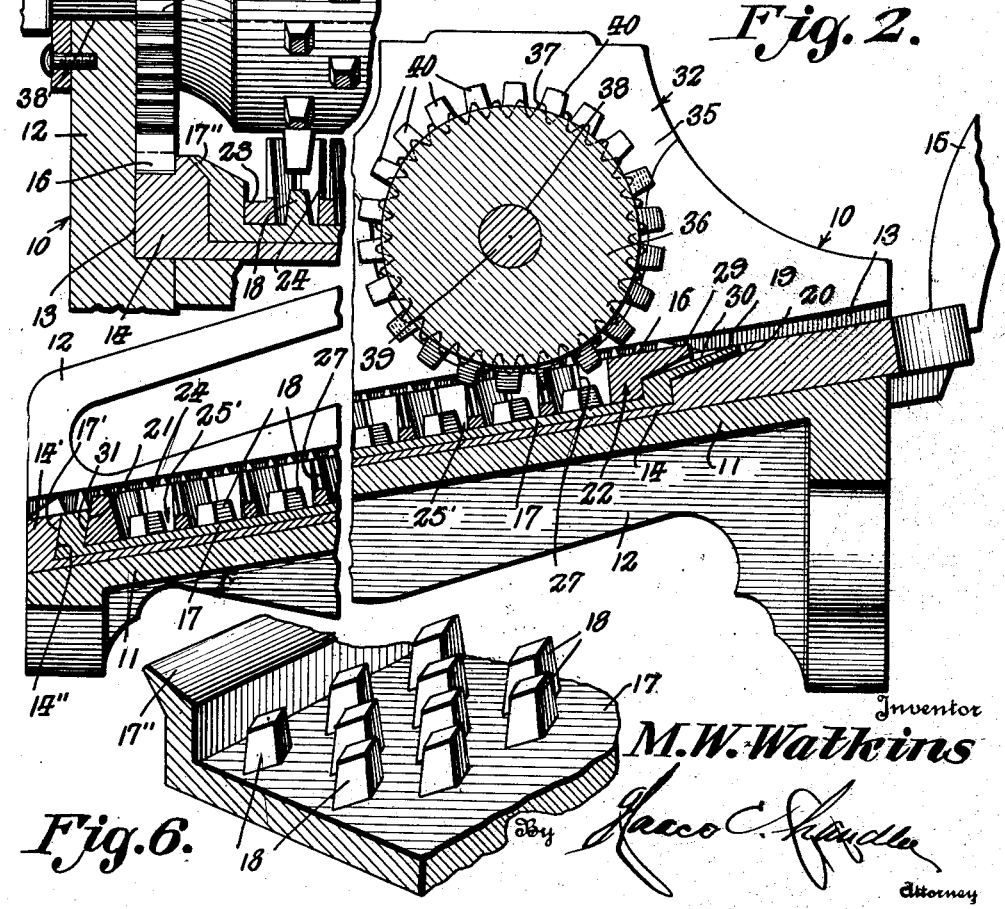
Fig. 2.
Fig. 5.
Fig. 6.
Inventor
M. W. Watkins Aug. 21, 1934.     M. W. WATKINS     1,970,991
MEAT TENDERER
Filed Dec. 30, 1932     2 Sheets-Sheet 2

Inventor
M. W. Watkins
By [signature]
Attorney

Patented Aug. 21, 1934

1,970,991

UNITED STATES PATENT OFFICE 1,970,991

MEAT-TENDERER

Morris W. Watkins, Milledgeville, Ga.

Application December 30, 1932, Serial No. 649,638

8 Claims. (Cl. 17—27)

This invention relates to new and useful improvements in devices for treating meat, and particularly to devices for tendering and scoring steaks.

One object of the invention is to provide a device of this character by means of which a piece of meat may be quickly and easily treated whereby to render the meat tender, and so condition the same that it will more easily and properly cook.

Another object is to provide a device of this character by means of which a piece of meat may be treated whereby to score the opposite faces thereof, and produce a multiplicity of small regularly sized pieces connected together by small slightly compressed webs, and wherein said pieces will, also, be compressed, thereby obviating the mangling of the meat.

Another object is to provide a device of this character which may be readily taken apart for cleaning and adjustments.

Other objects and advantages will be apparent from the following description when taken in connection with the accompanying drawings.

In the drawings:

Figure 1 is a side elevation of a meat tendering device, made in accordance with the present invention.

Figure 2 is an enlarged vertical longitudinal sectional view, showing the relation between the meat tendering elements of the tray and drum.

Figure 5 is an enlarged vertical transverse fragmentary sectional view, showing the relation of the meat engaging elements of the tray and of the drum.

Figure 6 is a fragmentary perspective view showing the lugs of the tray.

Figure 3:
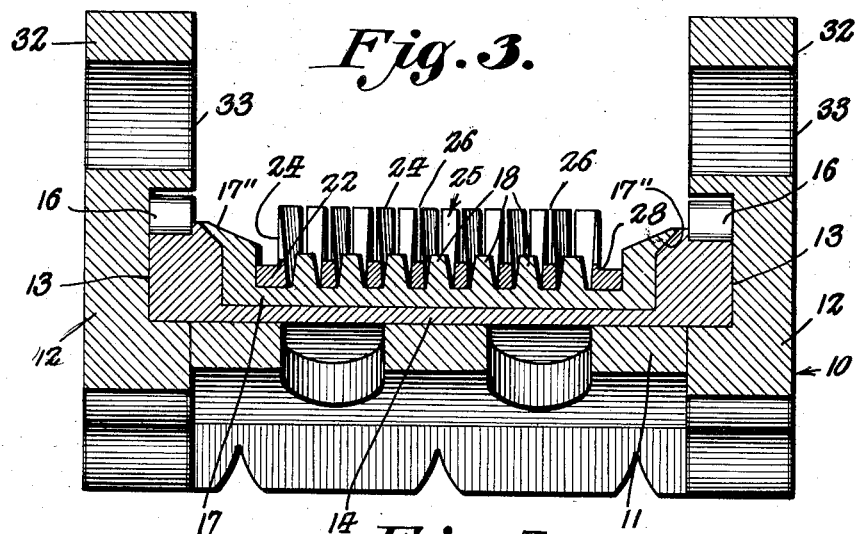
Figure 3 is an enlarged vertical transverse sectional view on the line 3—3 of Figure 1.
Figure 4:
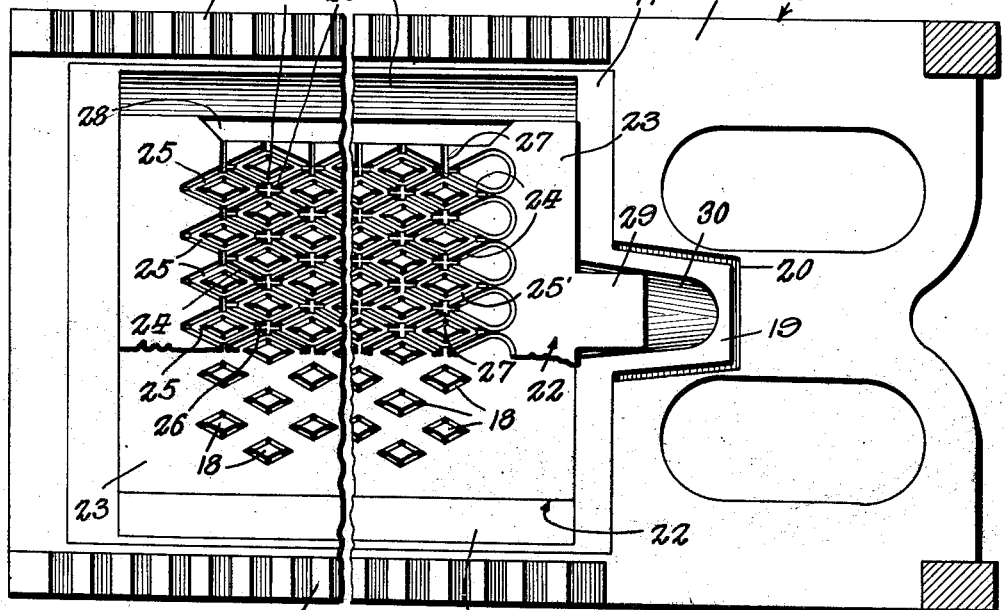
Figure 4 is a fragmentary top plan view, the drum being removed.

Referring particularly to the accompanying drawings, there is shown an elongated supporting frame, represented as a whole by the numeral 10, and which comprises the bottom 11, supported by and extending between vertical longitudinal side members 12, said bottom and side members inclining toward one end of the frame, as clearly seen in Figures 1 and 2, of the drawings. Formed in the inner face of each of the side members 12, just above the upper face of the bottom 11, is a longitudinal groove 13, said groove being in parallel relation to said face of the bottom.

Slidable on the upper face of the bottom 11, and having its sides engaged in said grooves 13, is a tray 14, the higher end of which is provided with a handle 15, by which said tray may be moved longitudinally on said bottom, and in said grooves. On the upper face of each side of the said tray 14, and lying within a groove 13, is a toothed rack 16. The lower end wall 14′, of the tray 14, is undercut, as shown at 14′′, in Figure 2. Disposed within the tray 14 is a second tray 17, one end of which is beveled, as at 17′, to fit beneath the undercut wall of the tray 14, also clearly seen in Figure 2. The upper portions of the side walls of the tray 17 are downwardly and inwardly inclined, as at 17′′, to permit the juices of the meat to run down thereinto. Mounted on the upper face of the bottom of the tray 17 are the upstanding lugs 18, each of which is triangular in cross section, and tapers toward its upper end. The upper end of the tray 17 is provided with a fingerpiece 19, which permits easy removal of the tray from the tray 14, said fingerpiece being adapted to lie within a recess 20, formed in one end of the tray 14, as clearly seen in Figure 2, of the drawings. The lower end wall of the tray 17 is undercut, as shown at 21, for a purpose which will presently appear herein.

Removably disposed within the tray 17 is a grid 22, which includes the frame portion 23, diagonally across which are arranged the webs 24, defining triangular openings 25, which, when said tray is properly positioned in the tray 17, receive the triangular lugs 18, it being particularly noted that these openings are somewhat larger than said lugs, whereby to provide spaces 25′ therebetween. At each of the intersections of the diagonal webs 24 there are formed the vertical cuts 26 and 27, the former of which extend longitudinally of the grid, while the latter extend transversely thereof. Each of the longer sides of the grid frame is formed with a ledge 28, the upper face of which lies slightly below the lower portion of the beveled or inclined sides of the tray 17. It will be noticed that the transverse cuts 27 extend through said side members of the grid frame. The upper end of the grid is provided with a fingerpiece 29, which, when said grid is properly disposed within the tray 17, rests within a recess 30, formed in the upper face of the fingerpiece 19, of said tray.

Figure 7:
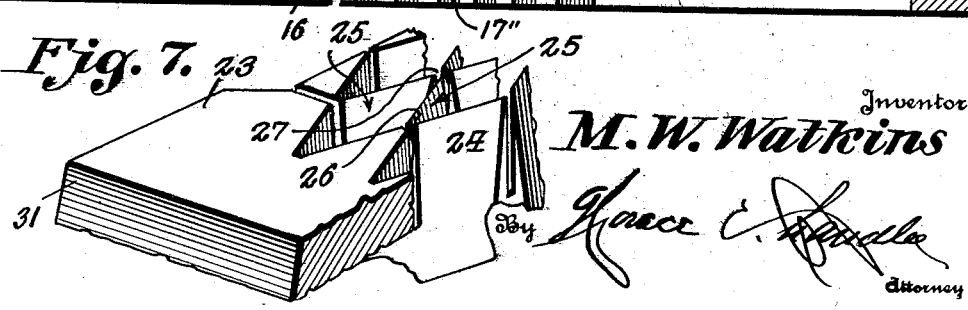
Figure 7 is a fragmentary perspective view of the cutting grid.

Each of the webs 24 is upwardly tapered whereby to produce a sharp upper edge, as shown, particularly, in Figure 7.

The lower end wall of the grid frame is beveled, as at 31, to properly fit within the undercut end wall of the tray 17, as shown.

Adjacent the upper or higher end of each of the side members 12, of the supporting frame 10, there is formed an upward extension 32, in each of which is formed a vertically elongated opening 33, and mounted within the upper portion of each of these openings 33 is a downwardly urged spring pressed bearing block 34. In the inner face of each of these extensions 32 there is formed a recess 35, which receives an end of the drum 36, said end having a peripherally arranged series of gear teeth 37, which engage with the teeth of one of the racks 16. Formed longitudinally through the center of the drum is a bore 38, which receives the shaft 39, said shaft being also engaged in the openings 33, and urged downwardly by the bearing blocks. Carried by the face of the drum, and radiating therefrom, are the outwardly tapering pins 40, which project downwardly into the triangular openings of the grid, and within a short distance from the upper ends of the lugs 18. It will be noted that the pins 40 are of such a size, with relation to the openings of the grid, that they properly clear the walls of said openings, as the drum rotates.

The operation of the device is as follows:

The operator grasps the handle 15, and moves the tray 14 to the limit of its movement, at either end of the supporting frame. As the tray is moved, the racks 16 engage the teeth of the drum 36 and cause the rotation thereof. The operator now places the piece of meat on the upper side of the grid, and then grasps the handle 15 and moves the tray 14 longitudinally of the device. As the tray 14 moves the drum is rotated thereby, which causes the said drum to press the meat against the sharpened upper edges of the webs 24, whereby to cut the meat into a multiplicity of small pieces, while the pins 40 press these small pieces into the openings of the grid. However, the portions of the meat which enter the cuts 26 and 27 are not as tightly compressed as the remainder of the meat, and serve as connecting webs to hold the meat together. The juices from the meat run down into the tray 17, and can be readily poured therefrom after the meat and the grid have been removed. Meat, treated in this manner, will be rendered extremely tender, and can be more easily attacked by heat, or hot grease, so that said meat will be cooked completely therethrough.

The construction of the device, with particular relation to the trays, readily permits the device to be taken apart for cleaning.

The spring pressed bearing blocks, in the openings 33, serve to maintain the proper contact of the drum with the meat, regardless of the thickness of the latter.

It is sometimes desirable to simply score the meat, and in this event, the tray 14 is removed and a tray having no lugs thereon, substituted, and at the same time a drum is used which does not have the pins 40. In this case the grid is placed directly within the tray 14, and the smooth faced drum presses the meat against the grid, whereby to properly cut the meat into small pieces, with the connecting webs. The substitution of drums is readily accomplished by reason of the fact that the shaft 39 is removable.

What is claimed is:

1. A meat treating device comprising a support, a reciprocable meat supporting element on the support, said element having a plurality of regularly spaced upwardly tapering lugs, a grid on the element receiving said lugs in the openings thereof, and a rotary element having a plurality of projecting pins cooperating with said lugs through the openings of said grid.

2. A meat treating device comprising a support, a reciprocable element on the support having a plurality of regularly spaced vertical upwardly tapering lugs, a grid on the reciprocable element having a plurality of cutting webs between which said lugs are arranged, and a rotary element having projecting pins cooperating with said lugs between said cutting webs, said grid having cuts at the intersections of said cutting webs.

3. A meat treating device comprising a support, a reciprocable tray on the support, vertical regularly spaced upwardly tapering lugs within the tray, a grid in the tray receiving said lugs loosely and partly within the openings thereof, a rotatable drum on the support having radial pins cooperating with said lugs through the openings of said grid, said grid including intersecting cutting webs having transverse and longitudinal cuts at the intersections thereof, and geared connections between the tray and drum.

4. A meat treating device including a meat supporting member, a roller, said roller and member being movable one with respect to the other to cause meat supported on the member to be rolled beneath the roller, co-operating meat compressing lugs on the member and roller, and cutting blades supported to act on the meat intermediate the location of said lugs.

5. A meat treating device including a meat supporting member, a roller, said roller and member being movable one with respect to the other to cause meat supported on the member to be rolled beneath the roller, co-operating meat compressing lugs on the member and roller, and cutting blades supported on said member between the lugs thereon to cut the meat between the compressed portions.

6. A meat treating device including a meat supporting member, a roller, said roller and member being movable one with respect to the other to cause meat supported on the member to be rolled beneath the roller, co-operating meat compressing lugs on the member and roller, and cutting blades supported on said member between the lugs thereon to cut the meat between the compressed portions, said blades being arranged in sets with each set surrounding a respective lug on the member.

7. A meat treating device including a meat supporting member, a roller, said roller and member being movable one with respect to the other to cause meat supported on the member to be rolled beneath the roller, co-operating meat compressing lugs on the member and roller, and cutting blades supported on said member between the lugs thereon to cut the meat between the compressed portions, said blades projecting above the lugs on said member.

8. A meat treating device including a meat supporting member, a roller, said roller and member being movable one with respect to the other to cause meat supported on the member to be rolled beneath the roller, co-operating meat compressing lugs on the member and roller, and cutting blades supported on said member between the lugs thereon to cut the meat between the compressed portions, said blades being arranged in sets with each set surrounding a respective lug on the member and projecting thereabove.

MORRIS W. WATKINS.